US007705711B2

(12) United States Patent
Takeuchi

(10) Patent No.: US 7,705,711 B2
(45) Date of Patent: Apr. 27, 2010

(54) INFORMATION-PROCESSING APPARATUS, WIRELESS COMMUNICATION SYSTEM AND WIRELESS COMMUNICATION METHOD

(75) Inventor: Isao Takeuchi, Tokyo (JP)

(73) Assignee: Sony Corporation (JP)

( * ) Notice: Subject to any disclaimer, the term of this patent is extended or adjusted under 35 U.S.C. 154(b) by 1061 days.

(21) Appl. No.: 10/573,765

(22) PCT Filed: Sep. 29, 2004

(86) PCT No.: PCT/JP2004/014692

§ 371 (c)(1),
(2), (4) Date: Mar. 29, 2006

(87) PCT Pub. No.: WO2005/031997

PCT Pub. Date: Apr. 7, 2005

(65) Prior Publication Data
US 2007/0120674 A1 May 31, 2007

(30) Foreign Application Priority Data
Sep. 30, 2003 (JP) ............................ P2003-341468

(51) Int. Cl.
*H04Q 5/22* (2006.01)
(52) U.S. Cl. ..................... 340/10.1; 455/296; 455/130
(58) Field of Classification Search ............... 340/10.1, 340/10.2, 825; 342/42, 44
See application file for complete search history.

(56) References Cited
U.S. PATENT DOCUMENTS 4,888,591 A * 12/1989 Landt et al. ................. 342/44

6,107,910 A * 8/2000 Nysen ....................... 340/10.1

FOREIGN PATENT DOCUMENTS

| JP | 5-290226 A | 11/1993 |
|---|---|---|
| JP | 6-187516 A | 7/1994 |
| JP | 07-193519 A | 7/1995 |
| JP | 08-122429 A | 5/1996 |
| JP | 8-330988 A | 12/1996 |
| JP | 10-062518 A | 3/1998 |
| JP | 11-239078 A | 8/1999 |

* cited by examiner

*Primary Examiner*—George A Bugg
*Assistant Examiner*—Sara Samson
(74) *Attorney, Agent, or Firm*—Lerner, David, Littenberg, Krumholz & Mentlik, LLP

(57) ABSTRACT

An information-processing apparatus shown in FIG. 4 is a wireless communication apparatus for communicating prescribed data in wireless with a back-scattering communication scheme, in which a tag (10) for receiving a carrier wave signal Sf having a frequency of 2.45 GHz and transmitting response signal Sf (D) obtained by modulating the carrier wave signal Sf based on the data and a tag reader (20) for transmitting a carrier wave signal to the tag (10) and receiving and signal-processing a response composite signal that is returned from the tag (10) are provided. This tag reader (20) has a carrier-wave-compensating circuit (30) that compares a phase of the carrier wave signal in transmitting the carrier wave signal and a phase of the carrier wave signal in receiving the carrier wave signal and eliminates a carrier wave composite signal that is not synchronized with the carrier wave signal in transmitting the carrier wave signal based on a comparison result thereof.

14 Claims, 8 Drawing Sheets

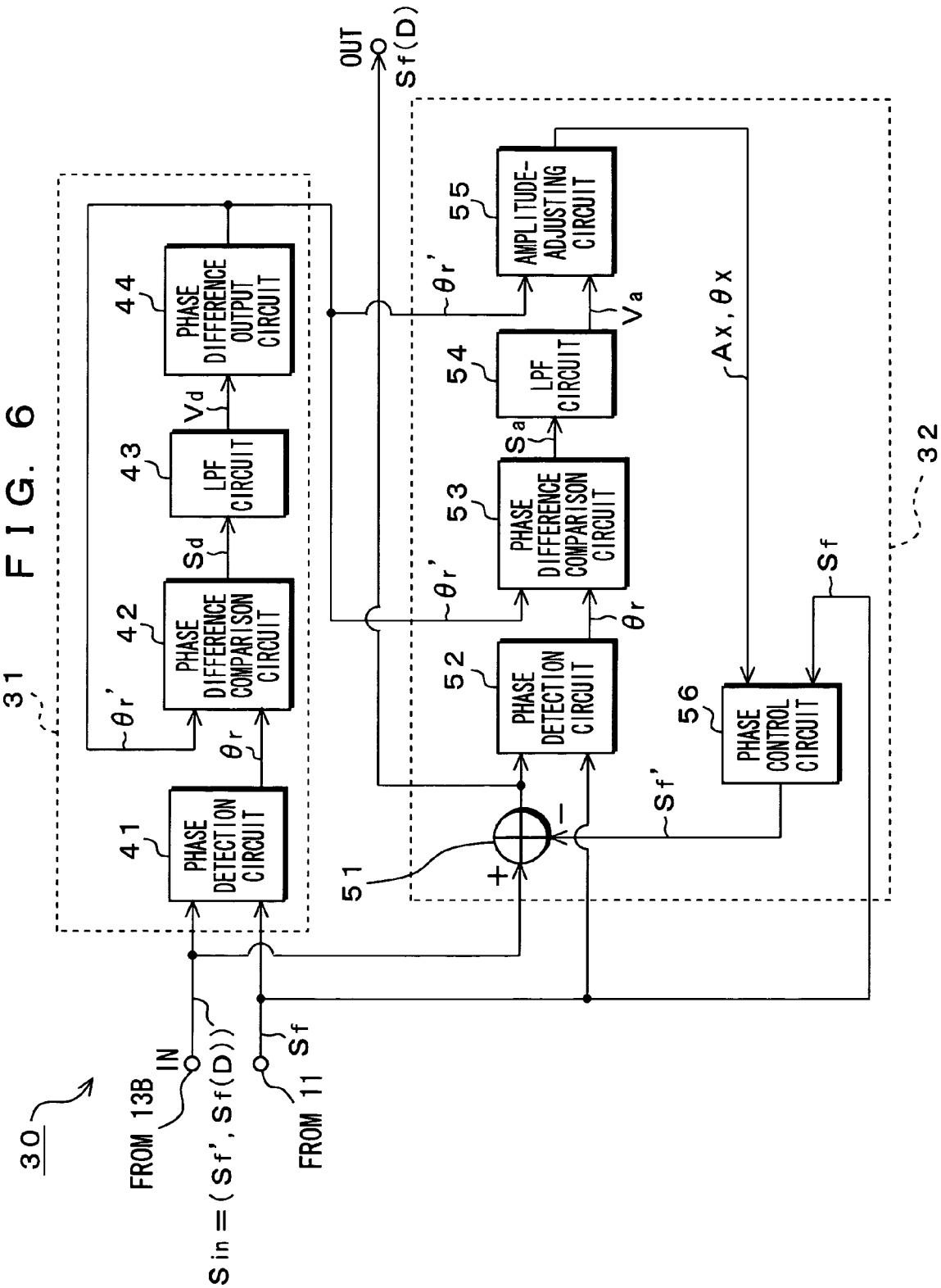

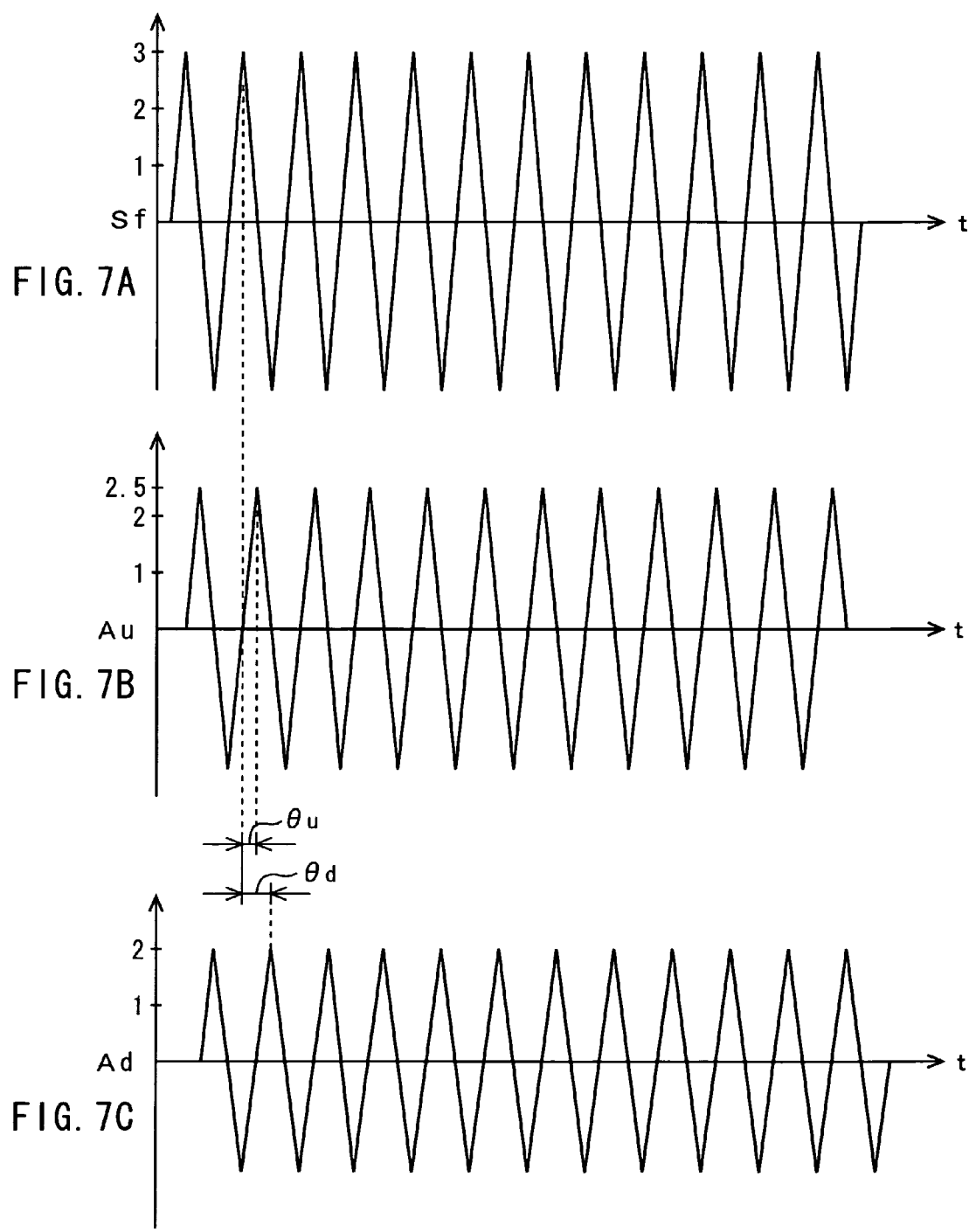

DATA

Sf(D)

Sin =
(Sf(D), Sf')

US 7,705,711 B2

INFORMATION-PROCESSING APPARATUS, WIRELESS COMMUNICATION SYSTEM AND WIRELESS COMMUNICATION METHOD

TECHNICAL FIELD

The present invention relates to an information-processing apparatus, a wireless communication system, and wireless communication method that are well applicable to a system for reading an electronic price tag attached to a dish or a plate in an eatery, an item in a shop and the like, a system for reading an electronic shipping tag attached to an article that is distributed in an article-distribution channel or the like, a system for reading a signpost that guides walking of visual handicapper and the like.

More particularly, the information-processing apparatus that performs wireless communication of desired data according to a back-scattering scheme is provided with a carrier-wave-compensating circuit in its signal-processing unit. The carrier-wave-compensating circuit compares a phase of a carrier wave signal in transmitting it with a phase of the carrier wave composite signal, which constitutes a response signal, in receiving the carrier wave signal and eliminates therefrom any carrier wave composite signal that is not synchronized with the phase of the carrier wave signal in transmitting it based on a comparison result thereof. Thus, according to the invention, a data modulation component in a response signal that is transmitted from a signal-responding member can be compensated and an S/N ratio of the response signal that is returned from the signal-responding member can be improved.

BACKGROUND ART

Recently, wireless communication technology has been often applied to a communication-processing art such as a cellular phone and an information-processing art such as a wireless mouse and an access point, accompanying with development of technology on a semiconductor integrated circuit. As an applied example of such the wireless communication technology, a tag and reader system has been invented. This tag and reader system performs the wireless communication of prescribed data according to the back-scattering scheme and is applied to a system for reading an electronic price tag attached to a dish or a plate in an eatery, for example.

The tag and reader system 1 shown in FIG. 1 has a tag 10 and a tag reader 20', in which the tag reader 20' transmits a carrier wave signal having a prescribed frequency to the tag 10 in succession and receives an amplitude modulation signal scattered and returned from the tag 10 to acquire data that is unique to the corresponding tag.

In FIG. 1, the tag 10 receives a carrier wave signal (an interrogation signal) having a frequency of 2.45 GHz and performs, for example, amplitude modulation on the corresponding carrier wave signal based on such the unique data, to transmit a tag amplitude modulation signal thus modulated (hereinafter referred to as "response signal Sf (D)"). This tag 10 is attached to, for example, an object to be specified such as a dish or a plate in an eatery. The tag 10 has a receiving antenna body 1A, a transmitting antenna body 1B, an amplitude modulation unit 2, a memory unit 3, a clock oscillator 4 and a power-supplying unit 5. Although the antenna bodies 1A and 1B are separately described on their operations in two parts, they actually constitute one antenna.

The antenna body 1A receives a carrier wave signal Sf that is the interrogation signal in the tag and reader system 1. As the antenna bodies 1A and 1B, a loop antenna in which conductor is coiled is used. The antenna bodies 1A and 1B are connected to the power-supplying unit 5 that operates so as to supply to the amplitude modulation unit 2, the memory unit 3, and the clock oscillator 4 induced power according to the carrier wave signal Sf received by the antenna body 1A.

The memory unit 3 stores data, which is unique to the object to be specified, such as a price of cooked food on the dish or the plate, and this data is read out thereof based on the clock signal (CLK) to transmit the data to the amplitude modulation unit 2. As the memory unit 3, a read only memory (ROM) is used. The memory unit 3 is connected to the clock oscillator 4 that operates so as to oscillate a clock signal having a prescribed frequency and transmit the clock signal to the memory unit 3. The amplitude modulation unit 2 performs amplitude modulation on the carrier wave signal Sf based on the data read out of the memory unit 3. The amplitude modulation unit 2 is connected to the antenna body 1B from which the response signal Sf (D) thus amplitude-modified is transmitted.

The tag and reader system 1 is also provided with the tag reader 20' in addition to the above tag 10. The tag reader 20' operates to transmit the carrier wave signal Sf to the tag 10 and to receive the response signal Sf(D) returned from the tag 10 and process the signal. Actually, the antenna 13B may receive a non-modulated carrier wave composite signal Sf' that is reflected by and returned from surrounding matters, in addition to the response signal Sf (D). In other word, it may receive a response composite signal Sin including the response signal Sf(D) and the carrier wave composite signal Sf'.

In the tag reader 20', its main portion includes an oscillator 11, a signal-transmitting unit 12, a transmitting antenna body 13A, a receiving antenna body 13B, a signal-receiving unit 14' and the like. Although the antenna bodies 13A and 13B are separately described on their operations in two parts, they actually constitute one antenna. The oscillator 11 oscillates a carrier wave signal Sf having a frequency of 2.45 GHz. The oscillator 11 is connected to the signal-transmitting unit 12 that amplifies the carrier wave signal Sf based on an output permission signal S1 received via a control terminal 72 and transmits a carrier wave signal Sf (namely, Sout) thus amplified to the transmitting antenna body 13A. The transmitting antenna body 13A radiates the carrier wave signal Sf thus amplified.

The signal-receiving unit 14' operates to receive the response signal Sin in receiving it and to perform data de-modulation on it. The signal-receiving unit 14' has a de-modulation circuit 40 and a data-reading unit 50. The de-modulation circuit 40 is connected to the antenna body 13B and de-modulates the response signal Sf (D) based on the carrier wave signal Sf to transmit data (DATA) that is unique to the tag. The data-reading unit 50 is connected to the de-modulation circuit 40 and operates to read the data (DATA) that is unique to the tag and to transmit it to an output terminal 60. To the output terminal 60, a monitor 16 shown in FIG. 2 is connected through a control device, not shown. The monitor 16 displays the data, which has been read in the data-reading unit 50 and is unique to the tag.

Next, the following will describe some disadvantages in the tag and reader system 1. In the tag and reader system 1 shown in FIG. 2, a tag reader body 101 is provided with the monitor 16, read operation buttons 171, and the like.

In the tag and reader system 1, if an operator pushes any of the read operation buttons 171 of the tag reader body 101 down, the antenna body 13A shown in FIG. 1 radiates the amplified carrier wave signal Sout (namely Sf) so that the carrier wave signal Sf can be transmitted to the tag 10 via a channel I. If an object 90 stays in anywhere around, the carrier wave signal Sf transmitted to the tag 10 is reflected by the object 90 via a channel II and the tag reader 20' then receives a carrier wave composite signal Sf' thus reflected. It is to be noted that based on the data, the tag 10 performs amplitude modulation on the carrier wave signal Sf transmitted via the channel I.

On the other hand, the tag reader body 101 receives the response composite signal Sin returned from the tag 10 and performs signal-processing on it. Actually, the response composite signal Sin includes the response signal Sf(D), which is returned from the tag 10 via the channel III, based on the carrier wave signal Sf and the non-modulated carrier wave composite signal Sf', which is reflected by and returned from the object 90, and the antenna body 13B shown in FIG. 1 then receives the response composite signal Sf'. Thus, if the object 90 stays in anywhere around, the carrier wave composite signal Sf' returned from the object 90 causes any noise to be generated.

Regarding the tag and reader system, a Japanese patent Application Publication 1 (Japanese patent Application Publication No. H11-239078) discloses a wireless communication system of a modulation-back-scattering scheme. The wireless communication system has an interrogator and remote tags and the interrogator transmits an interrogate signal having a prescribed frequency to any of the remote tags. In this moment, as the interrogate signal, a narrow band downlink signal is used. Further, the remote tag performs an amplitude modulation on it to generate a response signal that has become a wide band uplink signal after the amplitude modulation and the interrogator receives the response signal to process it. Thus, use of the narrow band downlink signal and the wide band uplink signal allows a modulation-back-scattering (MBS) wireless communication system having a processed gain concerning an MBS background noise to be provided.

Regarding a background noise reduction method in such the system, a Japanese Patent Application Publication 2 (Japanese Patent Application Publication No. H07-193519) discloses a background noise reduction apparatus. This background noise reduction apparatus has a de-modulation unit, a frame power measurement circuit, a linear prediction analysis circuit, an inverse filtering circuit, and a subtraction unit. The frame power measurement circuit receives a de-modulated audio signal (hereinafter referred to as "de-modulation signal") from the de-modulation unit and obtains a power level thereof for every frame to compare it with a previously set threshold value. Based on a comparison result thereof, if the power level indicates the one on or below the threshold value, the linear prediction analysis circuit receives the de-modulation signal and performs linear prediction analysis on it to generate a linear prediction coefficient. The inverse filtering circuit performs an inverse filtering process on the de-modulated signal based on the linear prediction coefficient to obtain a prediction value thereof. The subtraction unit subtracts the prediction value from the received de-modulation signal. This allows only the background noise level to be decreased below the previously set value so that a receiver side can realize comfortable communication with the background noise being used as a part of the information.

The tag and reader system to which the MBS wireless communication system is applied relative to the conventional example has some disadvantages as follows:

(i) As shown in FIG. 2, if the object 90 stays in anywhere around the tag reader body 101, the carrier wave composite signal Sf' reflected by and returned from the object 90 causes any noise. This may result in a deterioration of S/N ratio of the response signal from the tag 10; and (ii) In order to restrain the deterioration of S/N ratio of the response signal received from the tag 10, such method is conceivable that the wireless communication system disclosed in the Patent Application Publication 1 and the background noise reduction apparatus disclosed in the Patent Application Publication 2 are combined. If, however, such the two technology concepts are merely combined, it is difficult to teach a configuration for eliminate the carrier wave composite signal Sf' reflected by and returned from the object 90. Therefore, a merely combined system accompanies a difficulty to compensate a data modulation component in the proper response signal transmitted from the tag 10.

DISCLOSURE OF THE INVENTION

An information-processing apparatus according to the invention is an information-processing apparatus that transmits a carrier wave signal having a prescribed frequency to a signal-responding member of a back-scattering communication scheme and receives and processes a response signal obtained by modulating the carrier wave signal by prescribed data from the signal-responding member. This apparatus comprises a signal-transmitting unit that transmits the carrier wave signal to the signal-responding member, and a signal-processing unit that receives and processes the response signal scattered from the signal-responding member. The signal-processing unit is provided with a carrier-wave-compensating circuit and the carrier-wave-compensating circuit compares a phase of the carrier wave signal in transmitting the carrier wave signal with a phase of the carrier wave signal in receiving the carrier wave signal and eliminates therefrom any carrier wave signal that is not synchronized with the phase of the carrier wave signal in transmitting the carrier wave signal on the basis of a comparison result thereof.

According to the information-processing apparatus of the invention, if transmitting a carrier wave signal having a prescribed frequency to a signal-responding member of a back-scattering communication scheme and receiving and processing a response signal obtained by modulating the carrier wave signal by prescribed data from the signal-responding member, the signal-transmitting unit transmits the carrier wave signal to the signal-responding member. The signal-processing unit then receives and processes the response signal scattered from the signal-responding member. On the assumption of this, the carrier-wave-compensating circuit provided in the signal-processing unit compares a phase of the carrier wave signal in transmitting the carrier wave signal with a phase of the carrier wave signal in receiving the carrier wave signal and eliminates therefrom any carrier wave signal that is not synchronized with the phase of the carrier wave signal in transmitting the carrier wave signal on the basis of a comparison result thereof.

For example, a phase synchronization detection unit compares a phase of the carrier wave signal in transmitting the carrier wave signal with a phase of the carrier wave signal in receiving the carrier wave signal and detects a carrier wave signal that is not synchronized with the phase of the carrier wave signal in transmitting the carrier wave signal. An amplitude-controlling unit eliminates therefrom the carrier wave signal, which is not synchronized with the phase of the carrier wave signal in transmitting the carrier wave signal, detected in the phase synchronization detection unit. In this time, an amplitude-adjusting circuit adjusts amplitude of the carrier wave signal, which is not synchronized with the phase of the carrier wave signal in transmitting the carrier wave signal, detected in the phase synchronization detection unit. A calculation circuit operates to subtract the carrier wave signal adjusted in its amplitude by the amplitude-adjusting circuit from the carrier wave signal in receiving the carrier wave signal.

Thus, since data modulation component of the response signal transmitted from the signal-responding member can be compensated so as to eliminate the carrier wave signal reflected by the surrounding object, S/N ratio of the response signal scattered from the signal-responding member may be improved. This allows the data to be de-modulated in a hi-reliability without receiving any influence of interference noise by the carrier wave signal reflected by the surrounding object.

A wireless communication system according to the invention is a wireless communication system that performs a wireless communication of prescribed data with a back-scattering communication scheme. The system comprises a signal-responding member that receives a carrier wave signal having a prescribed frequency and transmits a response signal obtained by modulating the carrier wave signal based on the prescribed data, and an information-processing apparatus having a wireless transmission and reception function, the information-processing apparatus transmitting the carrier wave signal to the signal-responding member and receiving and information-processing the response signal scattered from the signal-responding member. This information-processing apparatus includes a carrier-wave-compensating circuit that compares a phase of the carrier wave signal in transmitting the carrier wave signal with a phase of the carrier wave signal in receiving the carrier wave signal and eliminates therefrom any carrier wave signal that is not synchronized with the phase of the carrier wave signal in transmitting the carrier wave signal on the basis of a comparison result thereof.

According to the wireless communication system of the invention, if the prescribed data is communicated by wireless according to the back-scattering communication scheme, the information-processing apparatus according to the invention is applied thereto. In this apparatus, the signal-responding member that receives a carrier wave signal having a prescribed frequency and transmits a response signal obtained by modulating the carrier wave signal based on the data is attached to, for example, an object to be specified. From the information-processing apparatus having a wireless transmission and reception function to the signal-responding member, the carrier wave signal is transmitted and the information-processing apparatus receives and processes the response signal scattered from the signal-responding member. On the assumption of this, the carrier-wave-compensating circuit provided for the information-processing apparatus compares a phase of the carrier wave signal in transmitting the carrier wave signal with a phase of the carrier wave signal in receiving the carrier wave signal and eliminates therefrom any carrier wave signal that is not synchronized with the phase of the carrier wave signal in transmitting the carrier wave signal on the basis of a comparison result thereof.

Thus, since data modulation component included in the response signal transmitted from the signal-responding member can be compensated so as to eliminate the non-modulated carrier wave signal reflected by the surrounding object, S/N ratio of the response signal scattered from the signal-responding member may be improved. This allows the data to be de-modulated in a hi-reliability without receiving any influence of interference noise by the carrier wave signal reflected by the surrounding object.

A wireless communication method according to the invention relates to a wireless communication method of a back-scattering communication scheme in which a signal-responding member that receives a carrier wave signal having a prescribed frequency and transmits a response signal obtained by modulating the carrier wave signal based on the prescribed data is attached to an object to be specified, the carrier wave signal is transmitted to the signal-responding member attached to the object, and the response signal scattered from the signal-responding member is received and signal-processed. In this method, a phase of the carrier wave signal in transmitting the carrier wave signal is compared with a phase of the carrier wave signal in receiving the carrier wave signal and a carrier wave signal that is not synchronized with the phase of the carrier wave signal in transmitting the carrier wave signal is eliminated on the basis of a comparison result thereof.

According to the wireless communication method of the invention, since data modulation component of the response signal transmitted from the signal-responding member can be compensated if the prescribed data is communicated in wireless with a back-scattering communication scheme, S/N ratio of the response signal scattered from the signal-responding member may be improved. This allows the data to be de-modulated in a hi-reliability without receiving any influence of interference noise by the non-modulated carrier wave signal reflected by the surrounding object.

BRIEF DESCRIPTION OF THE DRAWINGS

FIG. 6 is a block diagram for illustrating an internal configuration of the carrier-wave-compensating circuit 30;

FIG. 7A is a diagram for illustrating a waveform example of the carrier wave signal Sf;

FIG. 7B is a diagram for illustrating a waveform example of the carrier wave signal Au in which a phase deviation generates;

FIG. 7C is a diagram for illustrating a waveform example of the carrier wave signal Ad in which a phase deviation generates;

BEST MODE FOR CARRYING OUT THE INVENTION

Figure 1:
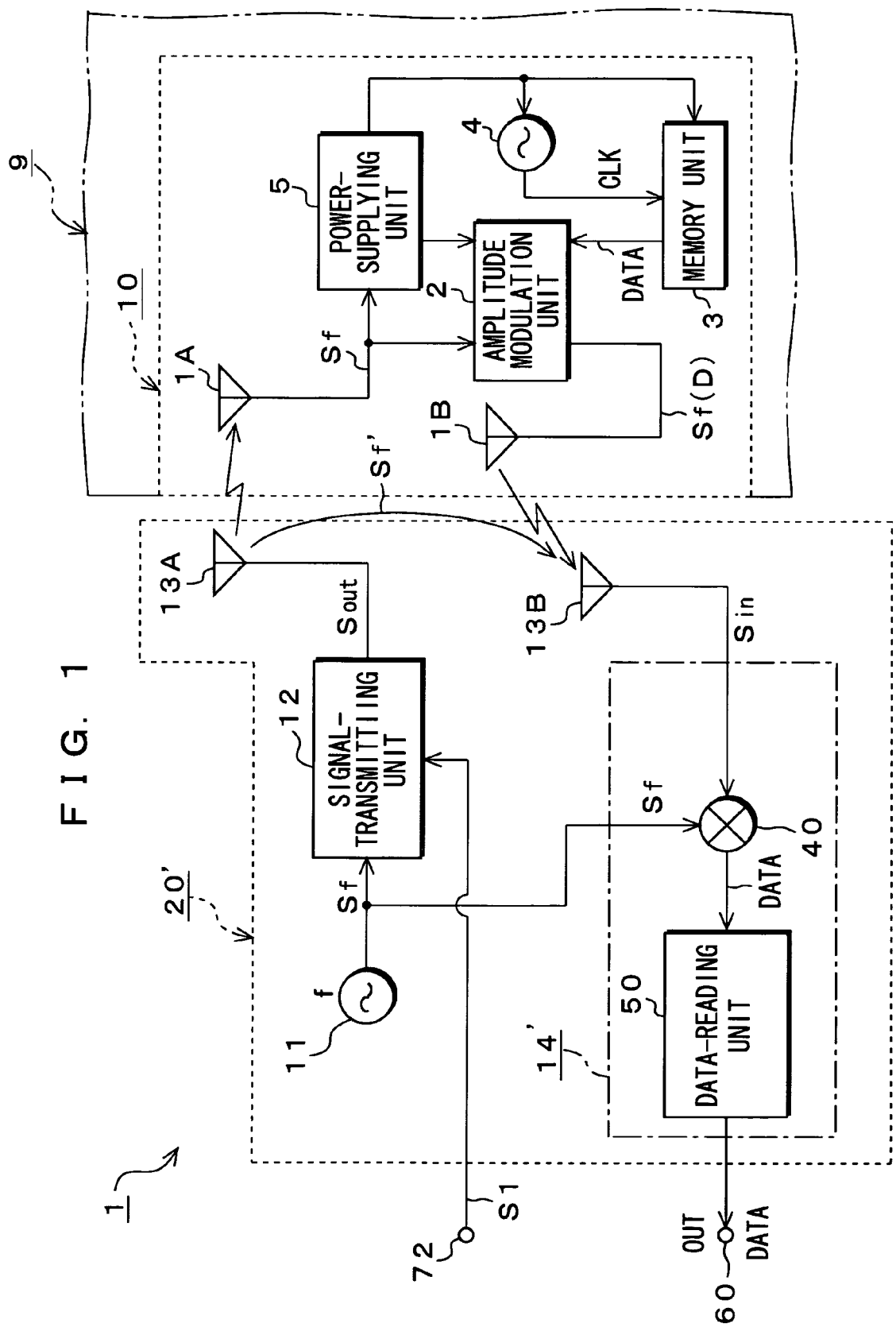
FIG. 1 is a conceptual diagram for illustrating a configuration of a conventional tag and reader system 1.
Figure 2:
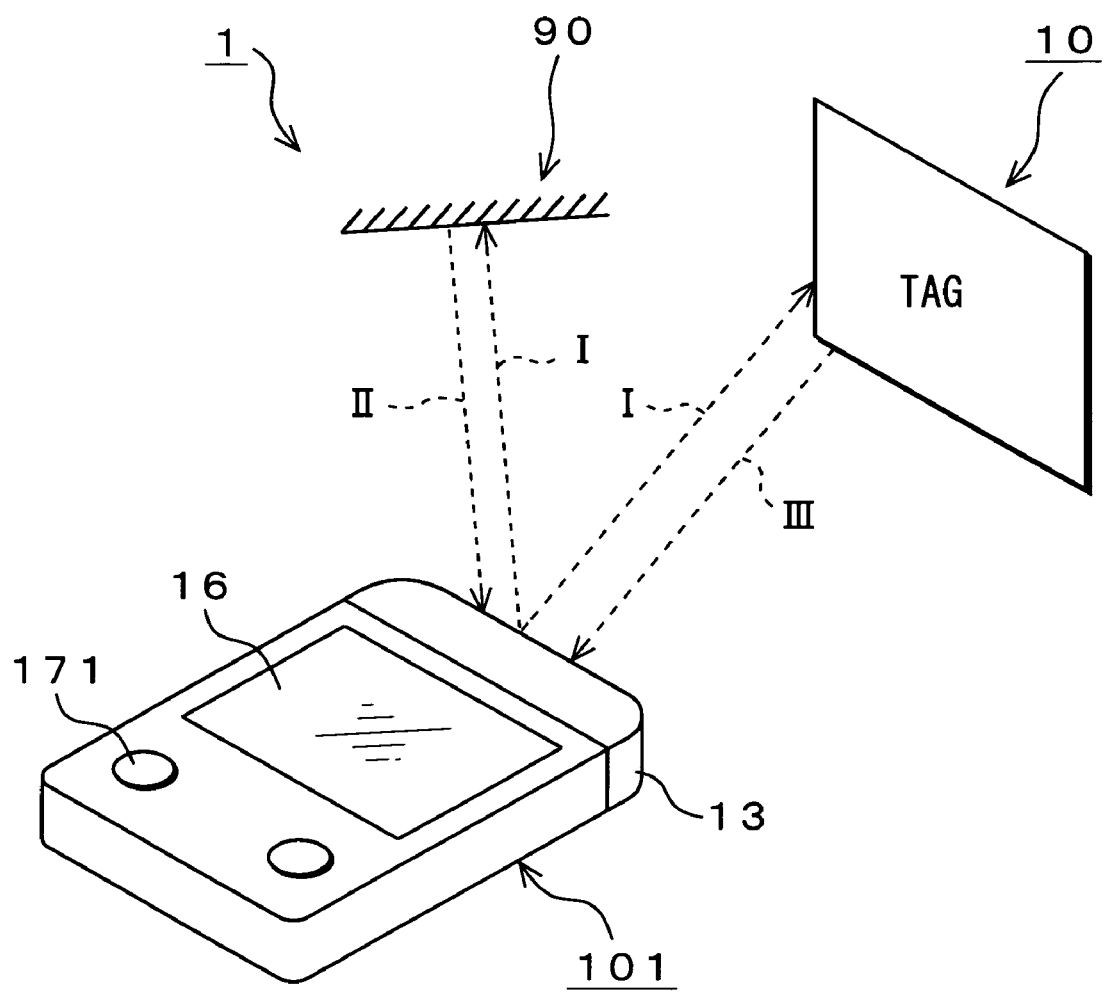
FIG. 2 is a conceptual diagram for illustrating disadvantages in the tag and reader system 1.

This invention solves the conventional problems and has an object to provide an information-processing apparatus, a wireless communication system, and wireless communication method by which if prescribed data is communicated in wireless according to a back-scattering communication scheme, data modulation component of response signal transmitted from the signal-responding member can be compensated and S/N ratio of the response signal returned from the signal-responding member can be improved.

The following will describe an embodiment of each of the information-processing apparatus, the wireless communication system, and the wireless communication method that are relative to the invention with referring to the drawings.

In this embodiment, the information-processing apparatus having a wireless transmission and reception function is provided with a carrier-wave-compensating circuit and if prescribed data is communicated in wireless according to a back-scattering communication scheme, a phase of the carrier wave signal in transmitting the carrier wave signal is compared with a phase of the carrier wave signal in receiving the carrier wave signal and a carrier wave signal that is not synchronized with the phase of the carrier wave signal in transmitting the carrier wave signal is eliminated on the basis of a comparison result thereof, thereby allowing the data modulation component of the response signal transmitted from the signal-responding member to be compensated and S/N ratio of the response signal returned from the signal-responding member to be improved.

Figure 3:
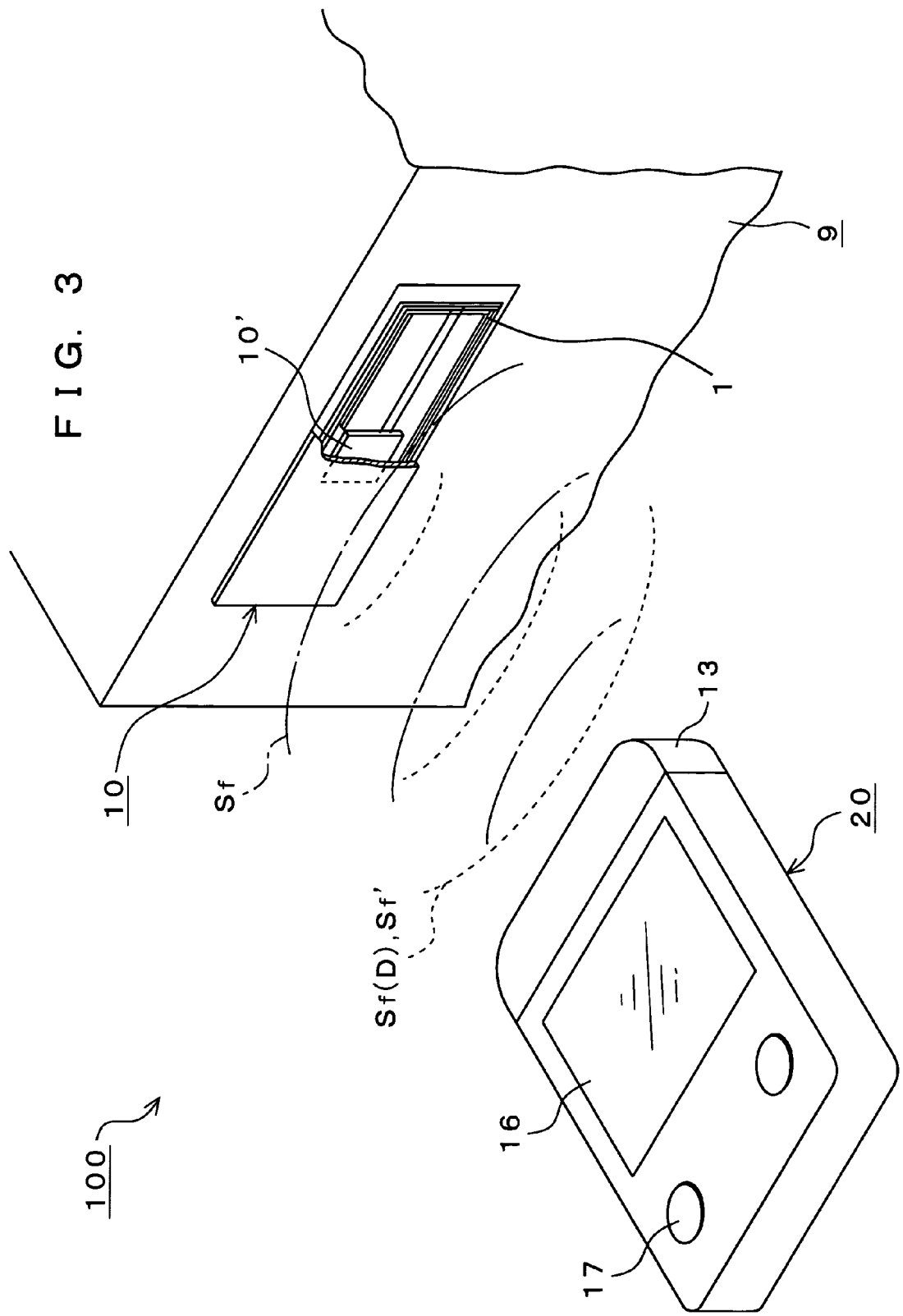
FIG. 3 is a perspective view showing a configuration of a tag and reader system 100 having a carrier wave compensation function as an embodiment of the invention.

The tag and reader system 100, shown in FIG. 3, having a carrier wave compensation function is an example of a wireless communication system in which prescribed data is communicated in wireless according to a back-scattering communication scheme. This system 100 is preferably applied to a system for reading an electronic price tag attached to a dish or a plate in an eatery, an item in a shop and the like, a system for reading an electronic shipping tag attached to an article that is distributed in an article-distribution channel or the like, a system for reading a signpost that guides walking of visual handicapper and the like.

In FIG. 3, the tag and reader system 100 has a tag 10 as an example of the signal-responding member and a tag reader 20 having a wireless transmission and reception function as an example of the information-processing apparatus. In the tag reader 20, a reader body is provided with an antenna body 13, a monitor 16, read operation buttons 17 and the like. In this embodiment, if any of the read operation buttons 17 is pushed down, a carrier wave signal (an interrogation signal) Sf of a prescribed frequency, for example, 2.45 GHz is radiated from the antenna body 13 to the tag 10. In FIG. 3, an alternate long and short dash line denotes the carrier wave signal Sf.

The tag 10 operates so as to receive the carrier wave signal Sf, perform a specified modulation processing on the carrier wave signal Sf based on data that is unique to it, and diffuse (transmit) a tag modulation signal (hereinafter also referred to as "response signal Sf (D)" simply) thus modulated. In FIG. 3, dotted line denotes the response signal Sf (D). Actually, it is a carrier signal Sf' reflected from any surrounding objects, which is combined to the response signal Sf (D), in addition to it that is received by the antenna 13. This tag 10 is used with it being attached to a prescribed object 9 to be specified. This tag 10 is utilized as an electronic price tag and an electronic shipping tag that are attached to the object 9 to be specified such as a dish or a plate in an eatery and an item in a shop. The tag 10 includes an IC chip 10' and a looped antenna body 1. The IC chip 10' and the antenna body 1 are integrally molded (modularized) into one plane piece using any resin or the like, which are attached to each of the dish or the plate and the item.

Next, the following will describe an internal configuration of the tag and reader system 100 in transmitting or receiving the signal. It is to be noted that the antenna body 1 of the tag 10 and the antenna body 13 of the tag reader 20, which are shown in FIG. 3, are separately described in two parts as antennas 1A and 1B or 13A and 13B, respectively, in order to explain a principle of the tag and reader. In the tag and reader system 100 shown in FIG. 4, the tag 10 operates so as to receive a carrier wave signal Sf having a prescribed frequency, to perform amplitude modulation on the carrier wave signal Sf, for example, based on data that is unique to it, and to transmit the response signal Sf (D) thus amplitude-modulated.

In this embodiment, the tag 10 has a receiving antenna body 1A, a transmitting antenna body 1B, an amplitude modulation unit 2, a memory unit 3, a clock oscillator 4, and a power-supplying unit 5. The amplitude modulation unit 2, the memory unit 3, the clock oscillator 4, and the power-supplying unit 5 are integrated into a semiconductor integrated circuit to form-IC chip 10'. The antenna body 1A receives a carrier wave signal Sf that is the interrogation signal in the tag and reader system 100. As the antenna bodies 1A and 1B, a loop antenna in which conductor is coiled is used. The antenna bodies 1A and 1B are connected to the power-supplying unit (also referred to as "power unit" simply) 5 that operates so as to supply to the amplitude modulation unit 2, the memory unit 3, and the clock oscillator 4 induced power according to the carrier wave signal Sf received by the antenna body 1A.

In the memory unit 3, data (code data and the like; DATA) that is unique to the object to be specified such as a price of cooked food on the dish or the plate and one attached to clothing, home electronic appliances and the like is stored and it operates so that the data is read out based on the clock signal (CLK) and the data is transmitted to the amplitude modulation unit 2. As the memory unit 3, a read only memory (ROM) or an electrically programmable read only memory (EEPROM) is used. The memory unit 3 is connected to the clock oscillator 4 that operates so as to oscillate a clock signal having a prescribed frequency and transmit the clock signal to the memory unit 3. The amplitude modulation unit 2 performs amplitude modulation on the carrier wave signal Sf based on the data read out of the memory unit 3. The carrier wave signal Sf amplitude-modulated based on the data is a response signal Sf (D). The amplitude modulation unit 2 is connected to the antenna body 1B that operates so as to scatter (transmit) the response signal Sf (D) thus amplitude-modified.

The tag and reader system 100 is also provided with the tag reader 20 having a wireless transmission and reception function, as an example of information-processing apparatus, in addition to the above tag 10. The tag reader 20 operates so as to transmit the carrier wave signal Sf to the tag 10 and to receive and signal-process the response signal Sf (D) scattered from the tag 10. The tag reader 20 has an oscillator 11, a signal-transmitting unit 12, a transmitting antenna body 13A, a receiving antenna body 13B, a signal-receiving unit 14, a control unit 15, an operation unit 16, a monitor 17, and a power-supplying unit 18.

The oscillator 11 oscillates a carrier wave signal Sf (=cos ωt) having a frequency of 2.54 GHz as an example of the prescribed frequency. The oscillator 11 is connected to the signal-transmitting unit 12 that amplifies the carrier wave signal Sf based on an output permission signal S1 received from the control unit 15 and transmits the carrier wave signal Sf thus amplified to the transmitting antenna body 13A. The output permission signal S1 operates so as to permit the transmission in a case of high level and not to permit the transmission in a case of low level. The transmitting antenna body 13A radiates the carrier wave signal Sf thus amplified. The signal-receiving unit 14 operates so as to receive the response composite signal Sin in receiving it and perform a data de-modulation processing on it. The response composite signal Sin in receiving it includes non-modulated carrier wave signal Sf' reflected from any surrounding objects and the response signal Sf (D) from the tag 10.

The signal-receiving unit 14 has, for example, a carrier-wave-compensating circuit 30, a de-modulation circuit 40 and a data-reading unit 50. The carrier-wave-compensating circuit 30 has a function to eliminate the non-modulated carrier wave composite signal Sf' that is reflected from any object other than the tag 10 and to compensate its data modulation component. For example, the carrier-wave-compensating circuit 30 operates so as to compare a phase of the carrier wave signal in transmitting the carrier wave signal with a phase of the response composite signal Sin as an example of the carrier wave signal in receiving the carrier wave signal and to eliminate therefrom any carrier wave composite signal Sf' that is not synchronized with the phase of the carrier wave signal Sf in transmitting the carrier wave signal on the basis of a comparison result thereof. A internal configuration of the carrier-wave-compensating circuit 30 will be described with reference to FIGS. 5A through 5C.

The carrier-wave-compensating circuit 30 is connected to the de-modulation circuit 40 that de-modulates the response signal Sf (D) based on the carrier wave signal Sf to transmit data (DATA) that is unique to the tag. The de-modulation circuit 40 is connected to the data-reading unit 50 so that the data-reading unit 50 operates so as to read the data (DATA) that is unique to the tag.

In this embodiment, the data-reading unit 50 is connected to the control unit 15 and the control unit 15 is also connected to the monitor 16, the operation unit 17 and the like. As the control unit 15, a central processing unit (hereinafter referred to as "CPU") is used. The monitor 16 displays a price, a name and the like based on the data, which is unique to the object 9 to be specified, read out of the tag 10. Such the price, the name and the like are displayed on the basis of display data D2 to which the control unit 15 receiving the data that is unique to the object 9 to be specified converts this data.

When reading the unique data such as the price, the name or the like of the object 9 out of it, the operation unit 17 operates so as to instruct the control unit 15 to read the data. From the operation unit 17 to the control unit 15, operation data D3 indicating read instruction is transmitted. The control unit 15 controls the signal-transmitting unit 12 based on the operation data D3. For example, the control unit 15 transmits the output permission signal S1 to the signal-transmitting unit 12 and controls output of the signal-transmitting unit 12 based on the output permission signal S1 to transmit the carrier wave signal Sf.

Figure 4:
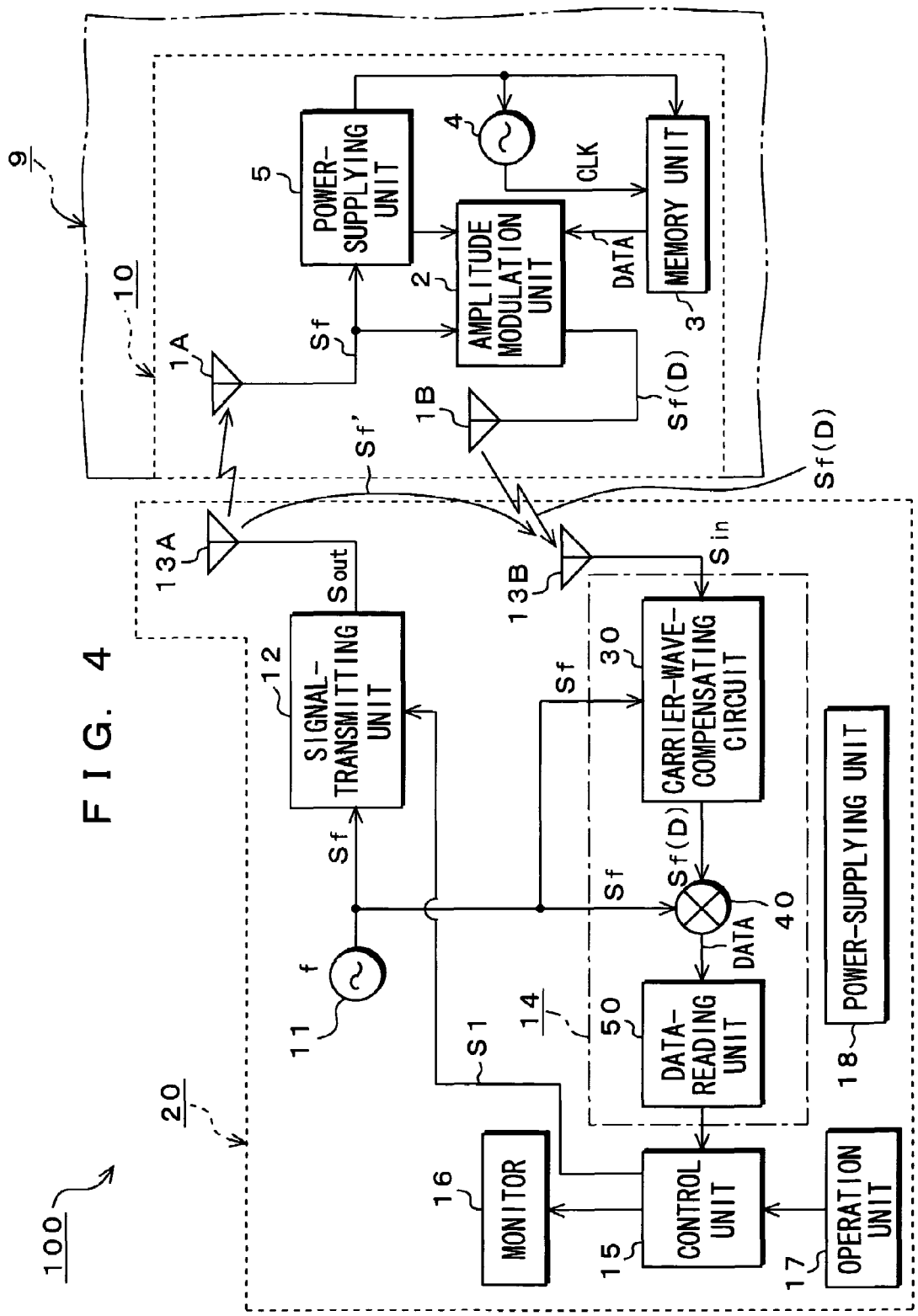
FIG. 4 is a block diagram for illustrating an internal configuration of the tag and reader system 100.

The power-supplying unit 5 operates so as to supply power to the oscillator 11, the signal-transmitting unit 12, the control unit 15, the monitor 16, the operation unit 17, the carrier-wave-compensating circuit 30, the de-modulation circuit 40, and the data-reading unit 50. In FIG. 4, a depiction of wiring for power supply is omitted.

Figure 5A:
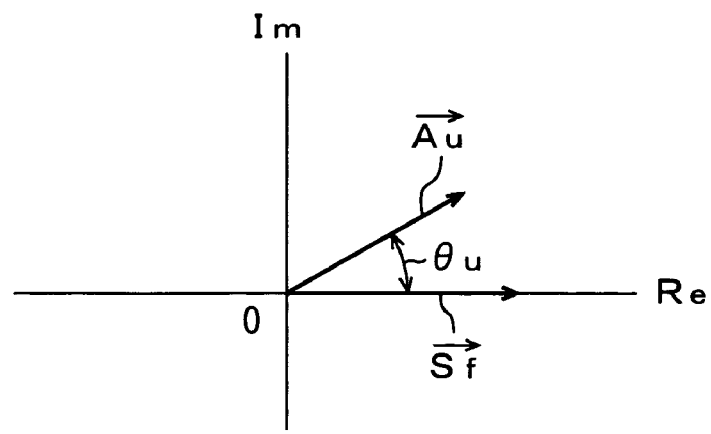
FIG. 5A is a vector diagram for illustrating a motion example of a carrier wave signal Sf to be treated in a carrier-wave-compensating circuit 30.
Figure 5B:
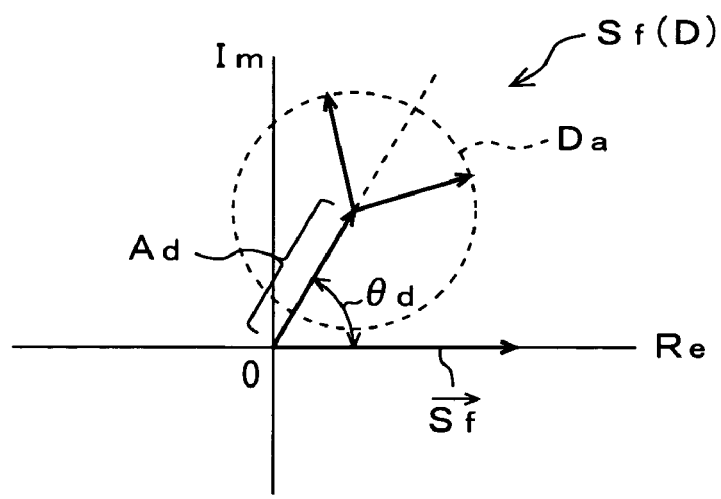
FIG. 5B is a vector diagram for illustrating a motion example of a response signal Sf (D) to be treated in the carrier-wave-compensating circuit 30.
Figure 5C:
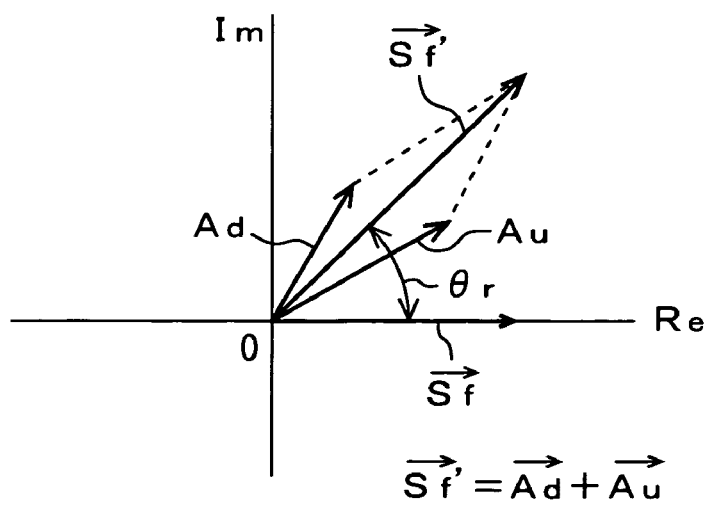
FIG. 5C is a vector diagram for illustrating a motion example of a carrier wave composite signal Sf' to be treated in the carrier-wave-compensating circuit 30.

Next, the following will describe each of the operation examples of the carrier wave signal Sf, the response signal Sf (D), and the carrier wave composite signal Sf', which are treated in the carrier-wave-compensating circuit 30, with referring to FIGS. 5A through 5C.

A carrier wave signal Au (its vector representation is omitted) shown in FIG. 5A denotes a signal reflected from any surrounding objects as reference of, for example, a carrier wave signal Sf having amplitude of "3" in transmitting the carrier wave signal. The carrier wave signal Sf and the carrier wave signal Au have a phase difference θu therebetween. The amplitude thereof always varies but it decreases to, for example, "2.5" (see FIG. 7B) if a moment is grasped. The response signal Sf (D) shown in FIG. 5B denotes a tag modulation signal that is obtained by performing amplitude modulation on the carrier wave signal Sf based on data, which is unique to the tag, and has a data modulation component Da and a carrier wave component Ad. Herein, the data modulation component Da refers to the data that is unique of the tag and is amplitude-modulated. The carrier wave component Ad and the carrier wave signal Sf have a phase difference θd therebetween. Amplitude of the carrier wave component Ad decreases to, for example, "2.0" (see FIG. 7C) if a moment is grasped.

The carrier wave composite signal Sf' shown in FIG. 5C is a vector composite signal between the carrier wave component Ad of the response signal Sf (D) and the carrier wave signal Au reflected from any surrounding objects and is noise component thereof. Amplitude thereof increases up to, for example, "4.5" (see FIG. 8C) if a moment is grasped.

This carrier-wave-compensating circuit 30 operates so as to eliminate any noise component that could have been not yet eliminated from the response composite signal Sin in receiving it, as before. It is conceivable that in receiving the carrier wave signal, the antenna 13B receives the response composite signal Sin including the carrier wave composite signal Sf' shown in FIG. 5C, which is reflected from any surrounding objects, and the data modulation component Da of the response signal Sf (D) shown in FIG. 5B, which is received from the tag 10.

It is conceivable that noise component in the response composite signal Sin in receiving the signal includes the non-modulated carrier wave signal Au and the carrier wave component Ad of the response signal Sf (D). It is also conceivable that from a phase of the carrier wave signal Au, the response signal Sf (D) from the tag 10 is deviated in its phase if a reflecting object is present, (namely being not synthesized therewith). Therefore, in order to pick out therefrom the original response signal Sf (D) obtained by performing amplitude modulation on the carrier wave signal Sf in this tag and reader system 100, it may be attained if the carrier wave composite signal Sf' is subtracted from the response composite signal Sin (=SD (D) and Sf') received at the antenna 13B in receiving the signal.

Next, the following will describe an internal configuration of the carrier-wave-compensating circuit 30. The carrier-wave-compensating circuit 30 shown in FIG. 6 has a phase synchronization detection unit 31 and an amplitude control unit 32. In FIG. 6, the phase synchronization detection unit 31 is a circuit for pursuing a phase of the response composite signal Sin including the carrier wave composite signal Sf' and the response signal Sf (D). This circuit operates so as to regenerate a phase difference θr shown in FIG. 5C between the carrier wave signal Sf in transmitting the carrier wave signal and the carrier wave composite signal Sf' on receiving it. For example, the phase synchronization detection unit 31 compares a phase (reference phase=0) of the carrier wave signal Sf in transmitting the carrier wave signal and a phase of the carrier wave composite signal Sf' in receiving it. This is because any carrier wave composite signal Sf' that is not synchronized with the carrier wave signal Sf in transmitting the carrier wave signal can be detected.

The phase synchronization detection unit 31 has, for example, a phase detection circuit 41, a phase difference comparison circuit 42, an LPF circuit 43, and a phase difference output circuit 44. The phase detection circuit 41 is connected to the signal-transmitting unit 12 and the receiving antenna body 13B, and operates so as to receive the response composite signal Sin in receiving the signal and the carrier wave signal Sf in transmitting the signal to detect the phase difference $\theta r$ therebetween. For example, in the phase detection circuit 41, with referring to a frequency component of the carrier wave signal Sf from the oscillator 11, a phase of the carrier wave composite signal Sf' of the response composite signal Sin in receiving the signal and a phase of the carrier wave signal Sf from the oscillator 11 are compared with each other. According to a comparison result thereof, the phase difference $\theta r$ as shown in FIG. 5C can be detected.

The phase detection circuit 41 is connected with the phase difference comparison circuit 42. The phase difference comparison circuit 42 compares an output of the phase difference output circuit 44 with the phase difference $\theta r$ of the phase detection circuit 41, and transmits a synchronization detection signal Sd (a direct current component thereof) to lock it into the carrier wave composite signal Sf' that is not synchronized with the carrier wave signal Sf in transmitting the carrier wave signal. As the phase detection circuit 41 and the phase difference comparison circuit 42, a multiplier is illustratively used.

Further, the phase difference comparison circuit 42 is connected with the LPF circuit 43. The LPF circuit 43 filters the synchronization detection signal Sd and transmits phase difference estimation voltage Vd. The phase difference estimation voltage Vd is a direct-current voltage for estimating the phase difference $\theta r$ of the carrier wave composite signal Sf' that is not synchronized with the carrier wave signal Sf in transmitting the carrier wave signal. The LPF circuit 43 is connected to the phase difference output circuit 44 that operates so as to transmit a phase difference estimation value $\theta r'$ based on the phase difference estimation voltage Vd to the phase difference comparison circuit 42 and the amplitude control unit 32.

Thus, the phase synchronization detection unit 31 operates so as to detect and compare the phase difference $\theta r$ between the carrier wave signal Sf in transmitting the carrier wave signal and the carrier wave composite signal Sf' in receiving it, to estimate the phase difference $\theta r$ using a primary loop, and to transmit the phase difference estimation value $\theta r'$ to the phase difference comparison circuit 53 and an amplitude-adjusting circuit 55 of the amplitude control unit 32.

The amplitude control unit 32 is a circuit for pursuing amplitude of the carrier wave composite signal Sf' in which the carrier wave signal Au reflected from any surrounding objects and a carrier wave component Ad of the response signal Sf (D) received from the tag 10 are combined. This circuit operates so as to regenerate the amplitude of the carrier wave composite signal Sf' in receiving it. The amplitude control unit 32 operates so as to eliminate the carrier wave composite signal Sf' from the response composite signal Sin in receiving it.

For example, the amplitude control unit 32 operates so as to reverse a phase of the carrier wave composite signal Sf' in receiving it that has been regenerated herein, to add the reversed one to the response composite signal Sin, to eliminate from the response composite signal Sin in receiving it any influence of the carrier wave signal Au reflected from any surrounding objects and the carrier wave component Ad of the response signal Sf (D), and to acquire only response signal Sf (D) received from the tag 10.

The amplitude control unit 32 has an arithmetic circuit 51, a phase detection circuit 52, the phase difference comparison circuit 53, an LPF circuit 54, the amplitude(level)-adjusting circuit 55, and a phase control circuit 56. The arithmetic circuit 51 is connected to the antenna body 13B and the phase control circuit 56, and operates so as to subtract from the response composite signal Sin in receiving it the carrier wave composite signal Sf' that is phase-controlled in the phase control circuit 56. In this embodiment, a signal that is obtained by subtracting the carrier wave composite signal Sf' from the response composite signal Sin is a response signal Sf (D) from the tag 10.

In order to obtain such the response signal Sf (D) from the tag 10, the phase detection circuit 52 is connected to the arithmetic circuit 51. The phase detection circuit 52 operates so as to receive the carrier wave signal Sf in transmitting the carrier wave signal and an output of the arithmetic circuit 51, namely, a carrier wave composite signal Sf' until the response signal Sf (D) is extracted from the response composite signal Sin in receiving it, and to detect the phase difference $\theta r$ between the carrier wave composite signal Sf' and the carrier wave signal Sf in transmitting the carrier wave signal. For example, similar to the phase synchronization detection unit 31, with reference to frequency component of the carrier wave signal Sf from the oscillator 11, the phase detection circuit 52 compares a phase of the carrier wave composite signal Sf' of the response composite signal Sin in receiving it with a phase of the carrier wave signal Sf received from the oscillator 11. According to the comparison result thereof, the phase difference $\theta r$ as shown in FIG. 5C can be detected.

The phase detection circuit 52 is connected to the phase difference comparison circuit 53. The phase difference comparison circuit 53 receives the phase difference estimation value $\theta r'$ from the phase difference output circuit 44 and an output of the phase detection circuit 52, namely, the phase difference $\theta r$ of the carrier wave composite signal Sf' in receiving it and compares the phase difference estimation value $\theta r'$ with the phase difference $\theta r$ of the carrier wave composite signal Sf'. The phase difference comparison circuit 53 then operates so as to transmit an amplitude adjustment signal (a direct-current component thereof) Sa in order to lock it into the carrier wave composite signal Sf' in receiving the signal to control the amplitude thereof.

Further, the phase difference comparison circuit 53 is connected to the LPF circuit 54. The LPF circuit 54 filters the amplitude adjustment signal Sa received from the phase difference comparison circuit 53 and transmits amplitude estimation voltage Va. The amplitude estimation voltage Va is a direct-current voltage for estimating an amplitude value of the carrier wave composite signal Sf' that is not synchronized with the carrier wave signal Sf in transmitting the carrier wave signal.

The LPF circuit 54 is connected to the amplitude-adjusting circuit 55. The amplitude-adjusting circuit 55 receives the amplitude estimation value Va transmitted from the LPF circuit 54 and the phase difference estimation value $\theta r'$ transmitted from the phase difference output circuit 44, adjusts its amplitude corresponding to the phase difference estimation value $\theta r'$ of the carrier wave composite signal Sf' in receiving it, and transmits the amplitude component thus amplitude-adjusted and the phase difference component. These amplitude component Ax and phase difference component $\theta x$ are used for eliminating the carrier wave composite signal Sf' from the response composite signal Sin.

The amplitude-adjusting circuit 55 is connected to the phase control circuit 56. The phase control circuit 56 receives the carrier wave signal Sf in transmitting the carrier wave signal from the oscillator 11 and the phase difference component θx and the amplitude component Ax, from the amplitude-adjusting circuit 55, in order to eliminate the carrier wave composite signal Sf'. The phase control circuit 56 controls a phase and amplitude of the carrier wave signal Sf received from the oscillator 11 based on the phase difference component θx and the amplitude component Ax received from the amplitude-adjusting circuit 55 and generates the carrier wave composite signal Sf'. The phase control circuit 56 transmits to the arithmetic circuit 51 the carrier wave composite signal Sf' generated by such the phase and amplitude controls. It is to be noted that as the phase detection circuit 52, the phase difference comparison circuit 53, the amplitude-adjusting circuit 55, and the phase control circuit 56, a multiplier is illustratively used.

This carrier wave composite signal Sf' is a signal including the carrier wave signal Au, shown in FIG. 5A, reflected from any surrounding objects in receiving the carrier wave signal and the carrier wave component Ad contained in the response signal Sf(D) shown in FIG. 5B, a phase of each of which is deviated from that of the carrier wave signal Sf in transmitting the carrier wave signal. In this embodiment, a phase control loop is locked when the phase difference estimation value θr' equals to the phase difference θr of the carrier wave composite signal Sf' so that a process of eliminating the carrier wave composite signal Sf' from the response composite signal Sin in receiving it can be attained. It operates so that the phase control loop process is repeatedly carried out until the phase difference estimation value θr' equals to the phase difference θr of the carrier wave composite signal Sf'.

Thus, the arithmetic circuit 51 operates so as to subtract the above-mentioned carrier wave composite signal Sf' from the response composite signal Sin in receiving it. The arithmetic circuit 51 transmits only the response signal Sf(D) obtained by performing amplitude modulation on the transmitted carrier wave signal Sf to the de-modulation circuit 40. The de-modulation circuit 40 operates so as to de-modulate the response signal Sf(D) based on the carrier wave signal Sf and to transmit the data (DATA) that is unique to the tag.

Figure 8A:
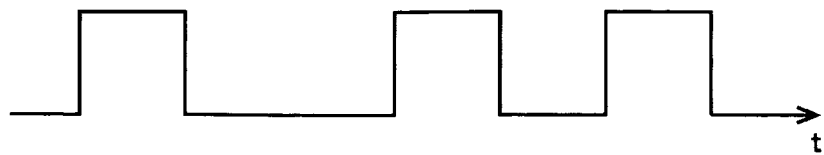
FIG. 8A is a diagram for illustrating a waveform example of data, which is unique to a tag, in the tag and reader system 100.
Figure 8B:
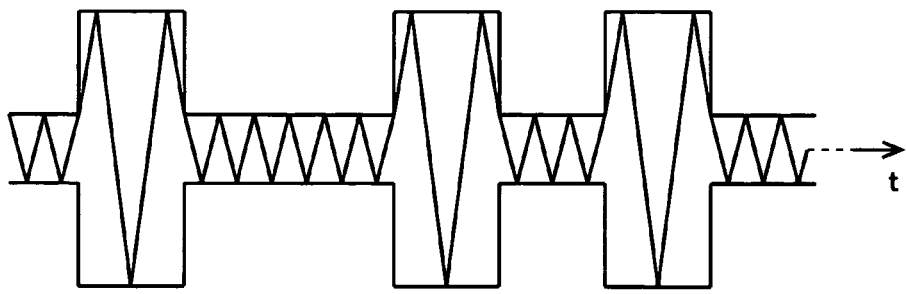
FIG. 8B is a diagram for illustrating a waveform example of the response signal Sf (D) that is amplitude-modulated based on the carrier wave signal Sf.
Figure 8C:
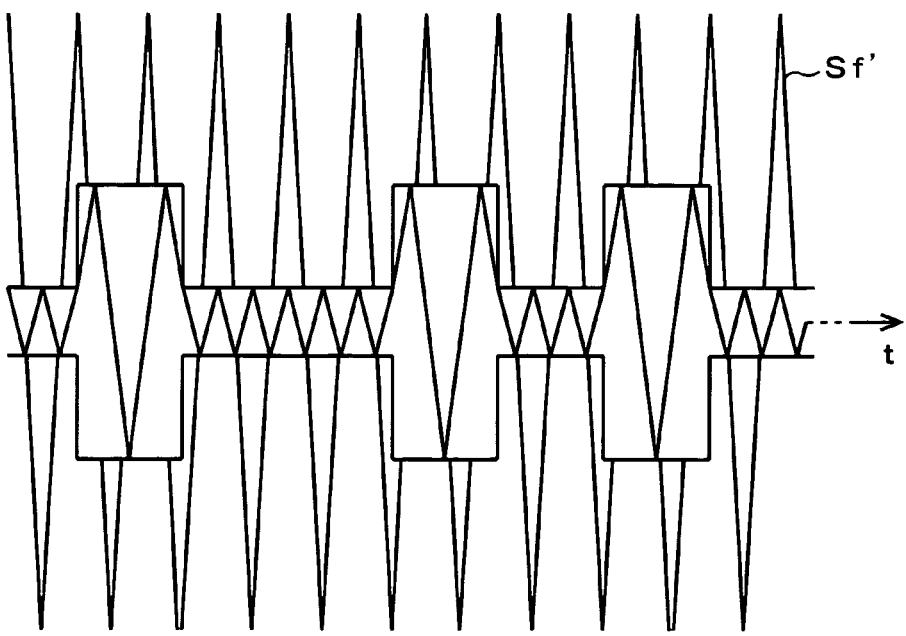
FIG. 8C is a diagram for illustrating a waveform example of the response composite signal Sin in receiving it in which the response signal Sf (D) and the carrier wave composite signal Sf' are shown with them being overlapped as a matter of convenience.

Further, the following will describe wireless communication method according to the invention. FIGS. 7A through 7C are diagrams each illustrating waveform examples of the carrier wave signal Sf and the carrier wave signals Au and Ad in each of which a phase deviation generates as well as FIGS. 8A through 8C are diagrams each illustrating a waveform example in each of the important portions of the tag and reader system 100. FIG. 8A is a diagram illustrating a waveform example of the data that is unique to the tag; FIG. 8B is a diagram illustrating a waveform example of the response signal Sf(D) that is amplitude-modulated on the basis of the carrier wave signal Sf; and FIG. 8C is a diagram illustrating a waveform example in which the response signal Sf (D) and the carrier wave composite signal Sf' are shown with them being overlapped as a matter of convenience. It is to be noted that every waveform is get if a moment is grasped and illustrated with their state being extended longer. Actually, their amplitude varies with time so that their waveforms are more complicated.

In this embodiment, the carrier-wave-compensating circuit 30 is positioned at a preceding part of the data-reading unit 50, e.g., a preceding part of the de-modulation circuit 30 in the signal-receiving unit 14 of the tag reader 20. The tag 10 that receives the carrier wave signal Sf of 2.45 GHz, performs amplitude modulation on the carrier wave signal Sf based on the prescribed data, and transmits the response signal Sf (D) is attached to the object 9 to be specified. It is assumed that the carrier wave signal Sf is transmitted toward the tag 10 attached to the object 9 to be specified and the tag reader 20 then receives the response composite signal Sin returned from the tag 10 and processes the response composite signal (wireless communication method of back-scattering communication scheme).

In the above-mentioned carrier-wave-compensating circuit 30, a phase of the carrier wave signal Sf in transmitting the carrier wave signal is compared with a phase of the carrier wave composite signal Sf' in receiving it. It operates so as to eliminate any carrier wave composite signal Sf' that is not synthesized with the carrier wave signal Sf in transmitting the carrier wave signal based on the comparison result thereof.

According to such the operation conditions, the oscillator 11 shown in FIG. 4 oscillates the carrier wave signal Sf of 2.45 GHz, as shown in FIG. 7A. The carrier wave signal Sf oscillated in the oscillator 11 is transmitted to the signal-transmitting unit 12. The carrier wave signal Sf has amplitude of "3", for example. The signal-transmitting unit 12 operates so that the carrier wave signal Sf can be amplified over the amplitude of "3" based on the output permission signal S1 from the control unit 15 and the amplified carrier wave signal Sf is transmitted to the transmitting antenna body 13A. The output permission signal S1 permits the transmission in a case of high level and does not permit the transmission in a case of low level, for example. The carrier wave signal (interrogation signal) Sf thus amplified is radiated from the transmitting antenna body 13A toward the tag 10.

On the other hand, the tag 10 receives the carrier wave signal (interrogation signal) Sf of 2.45 GHz. In this case, the interrogation signal transmitted from the tag reader 20 is reflected by and returned from any surrounding objects and the tag 10. This signal reflected an object other than the tag 10 is the carrier wave signal Au (herein, a single carrier signal), a phase of which is deviated, as shown in FIG. 5A, from that of the carrier wave signal Sf transmitted from the tag reader 20.

In other words, the carrier wave signal (interrogation signal) Sf that has been radiated toward the tag 10 becomes a waveform such that a phase of its carrier wave signal Au in receiving the carrier wave signal is deviated from that of the carrier wave signal Sf in transmitting the carrier wave signal, as shown in FIG. 7B, and its amplitude is decreased into an amount of, for example, "2" when the signal Sf is reflected by an object other than the tag 10 and returned. In FIG. 7B, θu represents a deviation of phase (phase difference). The phase difference θu is a difference between a phase of the carrier wave signal Sf radiated from the signal-transmitting unit 12 and a phase of the carrier wave signal Au reflected from any objects.

Further, in the tag 10, the power-supplying unit 5 connected to the antenna body 1A supplies to the amplitude modulation unit 2, the memory unit 3, and the clock oscillator 4 induced power according to the carrier wave signal Sf received by the antenna body 1A. Out of the memory unit 3, the data (code data and the like; DATA), which is shown in FIG. 8A, that is unique to the object to be specified is read on the basis of the clock signal (CLK) having a prescribed frequency and such the data is transmitted to the amplitude modulation unit 2. The clock signal is oscillated in the clock oscillator 4 and transmitted to the memory unit 3. Thus, the system 100 has a configuration such that any battery or the like can be avoided in the tag 10.

The amplitude modulation unit 2 operates so as to perform amplitude modulate on the carrier wave signal Sf based on the unique data read out of the memory unit 3 and to transmit the tag amplitude modulated signal (response signal) Sf (D) thus amplitude-modulated, as shown in FIG. 8B. The response signal Sf (D) is scattered (transmitted) through the antenna body 1B. In this embodiment, instead of the amplitude modulation unit 2, a binary phase shift keying (BPSK) modulation unit may be provided.

The response signal Sf (D) scattered (transmitted) from the antenna body 1B is received by the antenna 13B of the tag reader 20. In this case, the carrier wave composite signal Sf' including the carrier wave signal Au reflected from the objects is also combined with the response signal Sf (D) to form the response composite signal Sin and it is then received through the antenna body 13B, as shown in FIG. 8C.

The phase synchronization detection unit 31 connected to the antenna 13B operates so as to pursue a phase of the response composite signal Sin including the carrier wave composite signal Sf' and the response signal Sf (D) and to regenerate a phase difference $\theta r$, which is shown in FIG. 5C, between the carrier wave signal Sf in transmitting the carrier wave signal and the carrier wave composite signal Sf' in receiving it. In this time, in the phase detection circuit 41, with referring to a frequency component of the carrier wave signal Sf from the oscillator 11, a phase of the response composite signal Sin in receiving it and a phase of the carrier wave signal Sf from the oscillator 11 are compared with each other. According to this comparison result thereof, the phase difference $\theta r$, which is shown in FIG. 5C, of the carrier wave composite signal Sf' can be detected.

The phase difference $\theta r$ of the carrier wave composite signal Sf' is transmitted to the phase difference comparison circuit 42. The phase difference comparison circuit 42 operates so as to compare the phase difference estimation value $\theta r'$ transmitted from the phase difference output circuit 44 with the phase difference $\theta r$ transmitted from the phase detection circuit 41, and to transmit a synchronization detection signal Sd (a direct current component thereof) to lock it into the carrier wave composite signal Sf' that is not synchronized with the carrier wave signal Sf in transmitting the carrier wave signal.

The synchronization detection signal Sd is transmitted to the LPF circuit 43. The LPF circuit 43 filters the synchronization detection signal Sd and transmits the phase difference estimation voltage Vd. The phase difference estimation voltage Vd is a direct-current voltage for estimating the phase difference $\theta r$ of the carrier wave composite signal Sf' that is not synchronized with the carrier wave signal Sf in transmitting the carrier wave signal. The phase difference estimation voltage Vd is transmitted from the LPF circuit 43 to the phase difference output circuit 44. The phase difference output circuit 44 operates so as to transmit the phase difference estimation value $\theta r'$ based on the phase difference estimation voltage Vd to the phase difference comparison circuit 42 and the amplitude control unit 32.

Thus, the phase synchronization detection unit 31 operates so as to detect and compare the phase difference $\theta r$ between the carrier wave signal Sf in transmitting the carrier wave signal and the carrier wave composite signal Sf' in receiving it, to estimate the phase difference $\theta r$ using a primary loop, and to transmit the phase difference estimation value $\theta r'$ to the phase difference comparison circuit 53 and an amplitude-adjusting circuit 55 of the amplitude control unit 32.

The amplitude control unit 32 also operates so as to pursue amplitude of the carrier wave composite signal Sf' in which the carrier wave signal Au reflected from any surrounding objects and a carrier wave component Ad of the response signal Sf (D) received from the tag 10 are combined. For example, the arithmetic circuit 51 operates so as to subtract from the response composite signal Sin in receiving it the carrier wave composite signal Sf' that is phase-controlled in the phase control circuit 56. In this embodiment, a signal that is obtained by subtracting the carrier wave composite signal Sf' from the response composite signal Sin is a response signal Sf (D) from the tag 10, which includes the data modulation component Da.

In order to acquire the response signal Sf (D) from the tag 10, from the arithmetic circuit 51 to The phase detection circuit 52, the carrier wave signal Sf in transmitting the carrier wave signal and the carrier wave composite signal Sf' until the response signal Sf (D) is extracted from the response composite signal Sin in receiving it are transmitted. The phase detection circuit 52 operates so as to receive the carrier wave signal Sf in transmitting the carrier wave signal and the carrier wave composite signal Sf' until the response signal Sf (D) is extracted from the response composite signal Sin in receiving it, and to detect the phase difference $\theta r$ between the carrier wave composite signal Sf' and the carrier wave signal Sf in transmitting the carrier wave signal. For example, similar to the phase synchronization detection unit 31, with reference to frequency component of the carrier wave signal Sf from the oscillator 11, the phase detection circuit 52 compares a phase of the carrier wave composite signal Sf' in receiving it with a phase of the carrier wave signal Sf received from the oscillator 11. According to the comparison result thereof, the phase difference $\theta r$ shown in FIG. 5C can be detected.

The phase difference $\theta r$ is transmitted from the phase detection circuit 52 to the phase difference comparison circuit 53. The phase difference comparison circuit 53 operates so as to receive the phase difference estimation value $\theta r'$ from the phase difference output circuit 44 and the phase difference $\theta r$, which is transmitted from the phase detection circuit 52, of the carrier wave composite signal Sf' in receiving it and to compare the phase difference estimation value $\theta r'$ with the phase difference $\theta r$ of the carrier wave composite signal Sf'. According to the comparison result thereof, the phase difference comparison circuit 53 then transmits to the LPF circuit 54 an amplitude adjustment signal (a direct-current component thereof) Sa in order to lock it into the carrier wave composite signal Sf' in receiving it to control the amplitude thereof.

The LPF circuit 54 filters the amplitude adjustment signal Sa received from the phase difference comparison circuit 53 and transmits amplitude estimation value Va. The amplitude estimation value Va is a direct-current voltage for estimating an amplitude value of the carrier wave composite signal Sf' that is not synchronized with the carrier wave signal Sf in transmitting the carrier wave signal.

The amplitude estimation value Va is transmitted from the LPF circuit 54 to the amplitude-adjusting circuit 55. The amplitude-adjusting circuit 55 receives the amplitude estimation value Va transmitted from the LPF circuit 54 and the phase difference estimation value $\theta r'$ transmitted from the phase difference output circuit 44, adjusts its amplitude corresponding to the phase difference estimation value $\theta r'$ of the carrier wave composite signal Sf' in receiving it, and transmits the amplitude component Ax thus amplitude-adjusted and the phase difference component $\theta x$. These amplitude component Ax and phase difference component $\theta x$ are used for eliminating the carrier wave composite signal Sf' from the response composite signal Sin.

These amplitude component Ax and phase difference component $\theta x$ are transmitted from the amplitude-adjusting circuit 55 to the phase control circuit 56. The phase control circuit 56 receives the received carrier wave signal Sf from the oscillator 11 and the amplitude component Ax and the phase difference component θx from the amplitude-adjusting circuit 55 in order to eliminate the carrier wave composite signal Sf. The phase control circuit 56 controls a phase and amplitude of the carrier wave signal Sf received from the oscillator 11 based on the amplitude component Ax and the phase difference component θx received from the amplitude-adjusting circuit 55 and generates the carrier wave composite signal Sf. The carrier wave composite signal Sf thus generated by such the phase and amplitude control is transmitted from the phase control circuit 56 to the arithmetic circuit 51.

The carrier wave composite signal Sf is a signal including the carrier wave signal Au, as shown in FIG. 5A, reflected from any surrounding objects in receiving the carrier wave signal and the carrier wave component Ad contained in the response signal Sf (D) shown in FIG. 5B, a phase of each of which is deviated from that of the carrier wave signal Sf in transmitting the carrier wave signal. In this embodiment, when the phase difference estimation value θr' equals to the phase difference θr of the carrier wave composite signal Sf, the carrier wave composite signal Sf can be eliminated from the response composite signal Sin in receiving it.

The response signal Sf (D) in which the carrier wave composite signal Sf can be eliminated from the response composite signal Sin in receiving it is transmitted to the de-modulation circuit 40. The de-modulation circuit 40 operates so as to de-modulate the response signal Sf (D) based on the carrier wave signal Sf to transmit data (DATA) that is unique to the tag. This data is read in the data-reading unit 50 and the monitor 16 displays it via the control unit 15. The monitor 16 displays a price, a name and the like based on the data, read out of the tag 10, that is unique to the object 9 to be specified.

Thus, according to the embodiment of the tag and reader system 100 according to the invention, if prescribed data is communicated in wireless according to a back-scattering communication scheme, the amplitude control unit 32 of the signal-receiving unit 14 operates so as to regenerate the carrier wave composite signal Sf based on the carrier wave signal Sf transmitted from the tag reader 20 and the amplitude component Ax and the phase difference component θx of the carrier wave composite signal Sf, to reverse a phase of the carrier wave composite signal Sf thus regenerated in receiving the signal, and to add it to the response composite signal (amplitude-modulated signal of the tag 10) Sin.

Therefore, it is possible to eliminate from the response composite signal Sin in receiving it the carrier wave composite signal Sf including the carrier wave signal Au reflected from any surrounding objects and to acquire only the response signal (amplitude-modulated signal of the tag) Sf (D) received from the tag 10. This allows to be compensated the data modulation component Da included in the response signal Sf (D) returned fro the tag 10 and to be improved S/N ratio of the response signal Sf (D). It is also possible to de-modulate the data with a high reliability without receiving any influence of interference noise in spite of a relatively simple circuit configuration thereof.

INDUSTRIAL APPLICABILITY

This invention is well applicable to a system for reading an electronic price tag attached to a dish or a plate in an eatery, an item in a shop and the like, a system for reading an electronic shipping tag attached to an article that is distributed in an article-distribution channel or the like, a system for reading a signpost that guides walking of visual handicapper and the like.

The invention claimed is:

1. An information-processing apparatus that transmits a carrier wave signal having a prescribed frequency to a signal-responding member of a back-scattering communication scheme and that receives and processes a response signal obtained by modulating the carrier wave signal based on prescribed data from the signal-responding member, the apparatus comprising:
    a signal-transmitting unit that transmits the carrier wave signal to the signal-responding member; and
    a signal-processing unit that receives and processes the response signal scattered from the signal-responding member,
    wherein the signal-processing unit is provided with a carrier-wave-compensating circuit, the carrier-wave-compensating circuit being adapted to obtain the response signal by:
        comparing a phase of the carrier wave signal in transmitting the carrier wave signal with a phase of the carrier wave signal in receiving the carrier wave signal so as to detect any carrier wave signal that is not synchronized with the phase of the carrier wave signal in transmitting the carrier wave signal; and
        eliminating the detected carrier wave signal from the carrier wave signal in receiving the carrier wave signal by subtracting therefrom a replica of the detected carrier wave signal.

2. The information-processing apparatus according to claim 1, wherein the carrier-wave-compensating circuit includes:
    a phase synchronization detection unit that compares the phase of the carrier wave signal in transmitting the carrier wave signal with the phase of the carrier wave signal in receiving the carrier wave signal and detects a phase of the detected carrier wave signal; and
    an amplitude-controlling unit that eliminates the detected carrier wave signal from the carrier wave signal in receiving the carrier wave signal.

3. An information-processing apparatus that transmits a carrier wave signal having a prescribed frequency to a signal-responding member of a back-scattering communication scheme and receives and processes a response signal obtained by modulating the carrier wave signal based on prescribed data from the signal-responding member, the apparatus comprising:
    a signal-transmitting unit that transmits the carrier wave signal to the signal-responding member; and
    a signal-processing unit that receives and processes the response signal scattered from the signal-responding member, wherein the signal-processing unit is provided with a carrier-wave-compensating circuit, the carrier-wave-compensating circuit comparing a phase of the carrier wave signal in transmitting the carrier wave signal with a phase of the carrier wave signal in receiving the carrier wave signal and eliminating therefrom any carrier wave signal that is not synchronized with the phase of the carrier wave signal in transmitting the carrier wave signal on the basis of a comparison result thereof,
    wherein the carrier-wave-compensating circuit includes:
        a phase synchronization detection unit that compares a phase of the carrier wave signal in transmitting the carrier wave signal with a phase of the carrier wave signal in receiving the carrier wave signal and detects a carrier wave signal that is not synchronized with the phase of the carrier wave signal in transmitting the carrier wave signal; and an amplitude-controlling unit that eliminates therefrom the carrier wave signal, which is not synchronized with the phase of the carrier wave signal in transmitting the carrier wave signal, detected in the phase synchronization detection unit, wherein the amplitude-controlling unit includes:

an amplitude-adjusting circuit that adjusts amplitude of the carrier wave signal, which is not synchronized with the phase of the carrier wave signal in transmitting the carrier wave signal, detected in the phase synchronization detection unit; and a calculation circuit that subtracts the carrier wave signal adjusted in its amplitude by the amplitude-adjusting circuit from the carrier wave signal in receiving the carrier wave signal.

4. A wireless communication system that performs a wireless communication of prescribed data with a back-scattering communication scheme, the system comprising:

a signal-responding member that receives a carrier wave signal having a prescribed frequency and transmits a response signal obtained by modulating the carrier wave signal based on the prescribed data; and an information-processing apparatus having a wireless transmission and reception function, the information-processing apparatus transmitting the carrier wave signal to the signal-responding member and receiving and information-processing the response signal scattered from the signal-responding member, wherein the information-processing apparatus includes a carrier-wave-compensating circuit that obtains the response signal by:

comparing a phase of the carrier wave signal in transmitting the carrier wave signal with a phase of the carrier wave signal in receiving the carrier wave signal so as to detect any carrier wave signal that is not synchronized with the phase of the carrier wave signal in transmitting the carrier wave signal; and eliminating the detected carrier wave signal from the carrier wave signal in receiving the carrier wave signal by subtracting therefrom a replica of the detected carrier wave signal.

5. The wireless communication system according to claim 4, wherein the carrier-wave-compensating circuit includes:

a phase synchronization detection unit that compares the phase of the carrier wave signal in transmitting the carrier wave signal with the phase of the carrier wave signal in receiving the carrier wave signal and detects the phase of the detected carrier wave signal; and an amplitude-controlling unit that eliminates the detected carrier wave signal in receiving the carrier wave signal.

6. A wireless communication system that performs a wireless communication of prescribed data with a back-scattering communication scheme, the system comprising:

a signal-responding member that receives a carrier wave signal having a prescribed frequency and transmits a response signal obtained by modulating the carrier wave signal based on the prescribed data; and an information-processing apparatus having a wireless transmission and reception function, the information-processing apparatus transmitting the carrier wave signal to the signal-responding member and receiving and information-processing the response signal scattered from the signal-responding member, wherein the information-processing apparatus includes a carrier-wave-compensating circuit that compares a phase of the carrier wave signal in transmitting the carrier wave signal with a phase of the carrier wave signal in receiving the carrier wave signal and eliminates therefrom any carrier wave signal that is not synchronized with the phase of the carrier wave signal in transmitting the carrier wave signal on the basis of a comparison result thereof, wherein the carrier-wave-compensating circuit includes:

a phase synchronization detection unit that compares a phase of the carrier wave signal in transmitting the carrier wave signal with a phase of the carrier wave signal in receiving the carrier wave signal and detects a carrier wave signal that is not synchronized with the phase of the carrier wave signal in transmitting the carrier wave signal; and an amplitude-controlling unit that eliminates therefrom the carrier wave signal, which is not synchronized with the phase of the carrier wave signal in transmitting the carrier wave signal, detected in the phase synchronization detection unit, wherein the amplitude-controlling unit includes:

an amplitude-adjusting circuit that adjusts amplitude of the replica of the detected carrier wave signal; and a calculation circuit that subtracts the replica of the detected carrier wave signal, adjusted in its amplitude by the amplitude-adjusting circuit, from the carrier wave signal in receiving the carrier wave signal.

7. The wireless communication system according to claim 4, wherein the signal-responding member is used with it being attached to a prescribed object to be specified.

8. The wireless communication system according to claim 4, wherein the signal-responding member comprises:

an antenna body that receives the carrier wave signal;

a memory unit that stores the prescribed data;

an amplitude modulation unit that performs amplitude modulation on the carrier wave signal based on the prescribed data read out of the memory unit; and a power-supplying unit that supplies induced power to the memory unit and the amplitude modulation unit, the induced power being induced based on the carrier wave signal received by the antenna body.

9. A wireless communication method of a back-scattering communication scheme comprising the steps of:

attaching to an object to be specified a signal-responding member that receives a carrier wave signal having a prescribed frequency and that transmits a response signal obtained by modulating the carrier wave signal based on the prescribed data;

transmitting the carrier wave signal to the signal-responding member attached to the object; and receiving a reflected carrier wave signal;

obtaining and signal-processing the response signal returned from the signal-responding member, wherein the response signal is obtained by:

comparing a phase of the carrier wave signal in transmitting the carrier wave signal with a phase of the carrier wave signal in receiving the carrier wave signal so as to detect any carrier wave that is not synchronized with the phase of the carrier wave signal in transmitting the carrier wave signal and eliminating the detected carrier wave signal from the carrier wave signal in receiving the carrier wave signal by subtracting therefrom a replica of the detected carrier wave signal.

10. The wireless communication method according to claim 9, wherein:

comparing a phase of the carrier wave signal in transmitting the carrier wave signal with a phase of the carrier wave signal in receiving the carrier wave signal comprises: detecting a phase of the detected carrier wave signal; and eliminating the detected carrier wave signal responsive to detecting the phase of the detected carrier wave signal.

11. A wireless communication method of a back-scattering communication scheme comprising the steps of:

attaching to an object to be specified a signal-responding member that receives a carrier wave signal having a prescribed frequency and transmits a response signal obtained by modulating the carrier wave signal based on the prescribed data;

transmitting the carrier wave signal to the signal-responding member attached to the object; and receiving and signal-processing the response signal return from the signal-responding member, wherein a phase of the carrier wave signal in transmitting the carrier wave signal with a phase of the carrier wave signal in receiving the carrier wave signal are compared and a carrier wave signal that is not synchronized with the phase of the carrier wave signal in transmitting the carrier wave signal is eliminated on the basis of a comparison result thereof, wherein a phase of the carrier wave signal in transmitting the carrier wave signal with a phase of the carrier wave signal in receiving the carrier wave signal are compared; a carrier wave signal that is not synchronized with the phase of the carrier wave signal in transmitting the carrier wave signal; and the detected carrier wave signal, which is not synchronized with the phase of the carrier wave signal in transmitting the carrier wave signal is eliminated therefrom, wherein amplitude of the carrier wave signal, which is not synchronized with the phase of the carrier wave signal in transmitting the carrier wave signal is adjusted; and the carrier wave signal thus adjusted in its amplitude is subtracted from the carrier wave signal in receiving the carrier wave signal.

12. The information-processing apparatus according to claim 2, wherein the amplitude-controlling unit includes:

an amplitude-adjusting circuit that adjusts amplitude of the replica of the detected carrier wave signal; and a calculation circuit that subtracts the replica of the detected carrier wave signal, adjusted in its amplitude by the amplitude-adjusting circuit, from the carrier wave signal in receiving the carrier wave signal.

13. The wireless communication system according to claim 5, wherein the amplitude-controlling unit includes:

an amplitude-adjusting circuit that adjusts amplitude of the replica of the detected carrier wave signal; and a calculation circuit that subtracts the replica of the detected carrier wave signal, adjusted in its amplitude by the amplitude-adjusting circuit, from the carrier wave signal in receiving the carrier wave signal.

14. The wireless communication method according to claim 10, wherein eliminating the detected carrier wave signal further comprises:

adjusting amplitude of the replica of the detected carrier wave signal; and subtracting the replica of the detected carrier wave signal thus adjusted in its amplitude from the carrier wave signal in receiving the carrier wave signal.

* * * * *